US012725991B2

(12) United States Patent
Mukai

(10) Patent No.: US 12,725,991 B2
(45) Date of Patent: Sep. 1, 2026

(54) FLEXIBLE BUS BAR

(71) Applicant: SUNCALL CORPORATION, Kyoto (JP)

(72) Inventor: Yasuhiro Mukai, Kyoto (JP)

(73) Assignee: SUNCALL CORPORATION, Kyoto (JP)

(*) Notice: Subject to any disclaimer, the term of this patent is extended or adjusted under 35 U.S.C. 154(b) by 199 days.

(21) Appl. No.: 18/745,892

(22) Filed: Jun. 17, 2024

(65) Prior Publication Data

US 2024/0339794 A1 Oct. 10, 2024

Related U.S. Application Data

(63) Continuation of application No. PCT/JP2023/038813, filed on Oct. 27, 2023.

(30) Foreign Application Priority Data

Mar. 17, 2023 (JP) ................................ 2023-042657

(51) Int. Cl.
*H01R 25/14* (2006.01)
*H01B 7/02* (2006.01)

(52) U.S. Cl.
CPC ............... *H01R 25/14* (2013.01); *H01B 7/02* (2013.01)

(58) Field of Classification Search
CPC . H01R 25/14; H01R 4/58; H02G 5/00; H02G 5/005; H02G 5/02; H02G 5/04; H02G 5/06; H01B 7/00; H01B 7/02; H01B 7/04; H01B 7/08; H01B 5/02; H01M 50/588; H01M 50/591; H01M 50/505; H01M 50/503
USPC ...... 174/72 B, 68.2, 71 B, 88 B, 70 B, 99 B, 174/129 B, 133 B, 149 B; 361/611, 624, 361/627, 637, 639; 439/114
See application file for complete search history.

(56) References Cited

U.S. PATENT DOCUMENTS 3,609,215 A * 9/1971 Giger, Jr. ............... H02G 5/007 174/88 B
3,639,680 A * 2/1972 Dempsey, Jr. ........... H02G 5/06 174/117 FF
10,305,203 B2 * 5/2019 Murakami ............ H01M 50/50
10,460,853 B2 * 10/2019 Jones ....................... H01R 4/72
11,488,742 B2 * 11/2022 Dawson .............. H01M 50/526
2022/0324400 A1 * 10/2022 Hernandez Covarrubias .............. H01R 25/145
2025/0055148 A1 * 2/2025 Seon .................. H01M 50/517

FOREIGN PATENT DOCUMENTS

CN 208385032 U * 1/2019
JP 2004-119187 A 4/2004
JP 2008-41330 A 2/2008
JP 2010-272458 A 12/2010
JP 2014-90623 A 5/2014

(Continued)

*Primary Examiner* — Angel R Estrada
(74) *Attorney, Agent, or Firm* — Farber LLC

(57) ABSTRACT

A flexible bus bar that can maintain its flexibility even when covered with an insulator has a flexible bus bar main body having flexibility and an insulator covering a part of the flexible bus bar main body. The insulator has an interior S formed hollow, and the flexible bus bar main body is inserted into the hollow. Thereafter, a part of the insulator is heat-shrunk onto the inserted flexible bus bar main body, thereby fixing the part of the insulator.

2 Claims, 4 Drawing Sheets

(56) References Cited

FOREIGN PATENT DOCUMENTS

| | | | |
|---|---|---|---|
| JP | 2017-188288 | A | 10/2017 |
| JP | 2022-006856 | A | 1/2022 |
| JP | 2022-49303 | A | 3/2022 |
| JP | 2022-545548 | A | 10/2022 |

* cited by examiner

FLEXIBLE BUS BAR

FIELD OF THE INVENTION

The present invention relates to a flexible bus bar.

BACKGROUND OF THE INVENTION

In general, it is known to use a bus bar in connecting energizable members (for example, a battery installed in an electric vehicle, a hybrid car, etc.).

For example Japanese Published Unexamined Patent Application No. 2014-90623 (Patent Literature 1) discloses a bus bar. This bus bar is formed by forming terminals whose both ends are flattened by pressing, and by bending between the terminals by a bending process.

SUMMARY OF THE INVENTION

Incidentally, as shown in FIG. 4(*a*), a conventional bus bar 100 is made of metal such as copper, is formed, for example, in the shape of a thick plate with a thickness of about 3 mm to 5 mm, and is formed to be long and rectangular in cross section. In the bus bar 100, as shown in FIG. 4(*a*), a left bolt hole 100*al* having a rectangular cross sectional shape is vertically penetratingly provided on a left side surface 100*a* side, and a right bolt hole 100*b*1 having a rectangular cross sectional shape is vertically penetratingly provided on a right side surface 100*b* side.

Thus, by using such a bus bar 100, an energizable first member B1 having a vertically long rectangular shape when viewed from the front and an energizable second member B2 having a vertically long rectangular shape when viewed from the front shown in FIG. 4(*b*) are connected. Specifically, a first bolt hole B1*a* provided in the first member B1 and the right bolt hole 100*b*1 shown in FIG. 4(*b*) are aligned and fastened with a bolt (not shown), and a second bolt hole B2*a* provided in the second member B2 and the left bolt hole 100*al* shown in FIG. 4(*b*) are aligned and fastened with a bolt (not shown). Thereby, the bus bar 100 is fastened and fixed between the first member B1 and the second member B2, and thus the first member B1 and the second member B2 are connected using the bus bar 100.

However, if there is a difference in height between the first member B1 and the second member B2 as shown in FIG. 4(*b*), the first bolt hole B1*a* and the right bolt hole 100*b*1 shown in FIG. 4(*b*) cannot be aligned, and the second bolt hole B2*a* and the left bolt hole 100*al* shown in FIG. 4(*b*) cannot be aligned with the bus bar 100 as shown in FIG. 4(*a*). Consequently, as it is, the first member B1 and the second member B2 cannot be connected using the bus bar 100. In order to fill the difference in height, the bus bar 100 is subjected to a bending process as described in the foregoing Patent Literature 1.

However, even if a bending process is performed to fill the difference in height, the bus bar 100 as described above does not have flexibility and thus has such a problem that it cannot connect the first member B1 and the second member B2 when displaced even slightly.

Accordingly, it is conceivable to use a flexible bus bar having flexibility in order to solve such a problem.

Incidentally, a large current flows through the flexible bus bar as described above when it is used in a battery installed in an electric vehicle, a hybrid car, etc. Therefore, the flexible bus bar needs to be covered with an insulator such as resin in order to prevent danger or prevent a malfunction due to contact with other energizable members. In covering the flexible bus bar with an insulator, a method is known in which the flexible bus bar is immersed in a liquid resin and allowed to harden, thereby being covered with an insulator.

However, this poses such problems that the flexibility of the flexible bus bar may be impaired due to the insulator and further the insulator may be cracked when the flexible bus bar is bent to fill the difference in height as shown in FIG. 4(*b*).

Accordingly, in view of the foregoing problems, an object of the present invention is to provide a flexible bus bar that can maintain its flexibility even when covered with an insulator.

Solution to the Problem

The foregoing object of the present invention is achieved by the following means. It is noted that reference signs in an embodiment to be described later are added in parentheses, but the present invention is not limited thereto.

According to a first aspect of the present invention, a flexible bus bar (1) having a flexible bus bar main body (2) having flexibility and an insulator (3) covering a part of the flexible bus bar main body (2) is characterized in that the insulator (3) has an interior(S) formed hollow and is made of heat-shrinkable resin, and the flexible bus bar main body (2) is inserted into the hollow, and a part of the insulator (3) is heat-shrunk onto the inserted flexible bus bar main body (2), thereby fixing the part of the insulator (3).

According to a second aspect of the present invention, the flexible bus bar (1) set forth in the above first aspect is characterized in that the flexible bus bar main body (2) has through holes (left bolt hole 22*a*, right bolt hole 23*a*) formed at both end sides (left terminal portion 22, right terminal portion 23), and in fixing the part of the insulator (3) to the flexible bus bar main body (2), the insulator (3) is fixed to the flexible bus bar main body (2) by heat-shrinking both end sides (left side surface 3*a* side, right side surface 3*b* side) of the insulator (3) so as not to come in contact with the through holes (left bolt hole 22*a*, right bolt hole 23*a*).

Next, advantageous effects of the present invention will be described with reference signs in the drawings. It is noted that reference signs in an embodiment to be described later are added in parentheses, but the present invention is not limited thereto.

According to the first aspect of the present invention, since the part of the insulator (3) is fixed to the flexible bus bar main body (2), a space is formed between the flexible bus bar main body (2) and the interior(S) of the insulator (3). Thereby, the flexibility of the flexible bus bar main body (2) is not impaired, and the shape of the flexible bus bar main body (2) can thus be flexibly changed.

Therefore, according to the present invention, the flexibility can be maintained even when covered with the insulator (3).

According to the second aspect of the present invention, since the insulator (3) does not come in contact with the through holes (left bolt hole 22*a*, right bolt hole 23*a*), a malfunction such as current not flowing when the energizable members are connected can be prevented.

DETAILED DESCRIPTION OF THE PREFERRED EMBODIMENT

Hereinafter, a flexible bus bar according to an embodiment of the present invention will be specifically described with reference to the drawings. It is noted that, in the following description, when vertical and horizontal directions are indicated, it shall mean vertical and horizontal directions when viewed from the front of the figure.

Figure 1A:
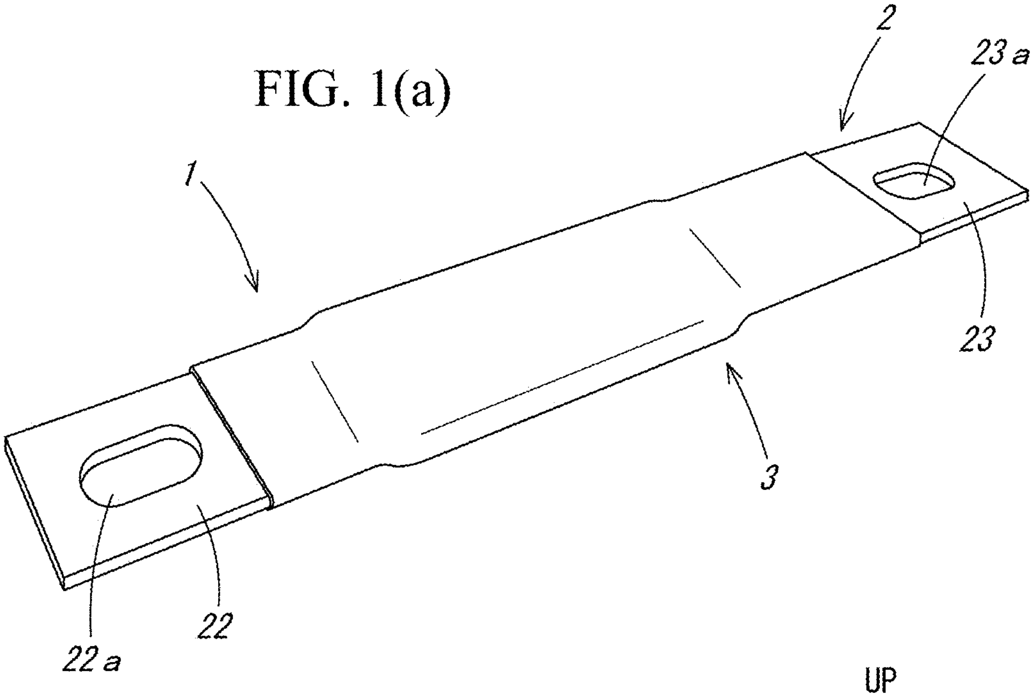
FIG. 1(*a*) is a perspective view of a flexible bus bar according to an embodiment of the present invention, and FIG. 1(*b*) is a side view and partially longitudinal sectional view of the flexible bus bar according to the same embodiment.
Figure 1B:
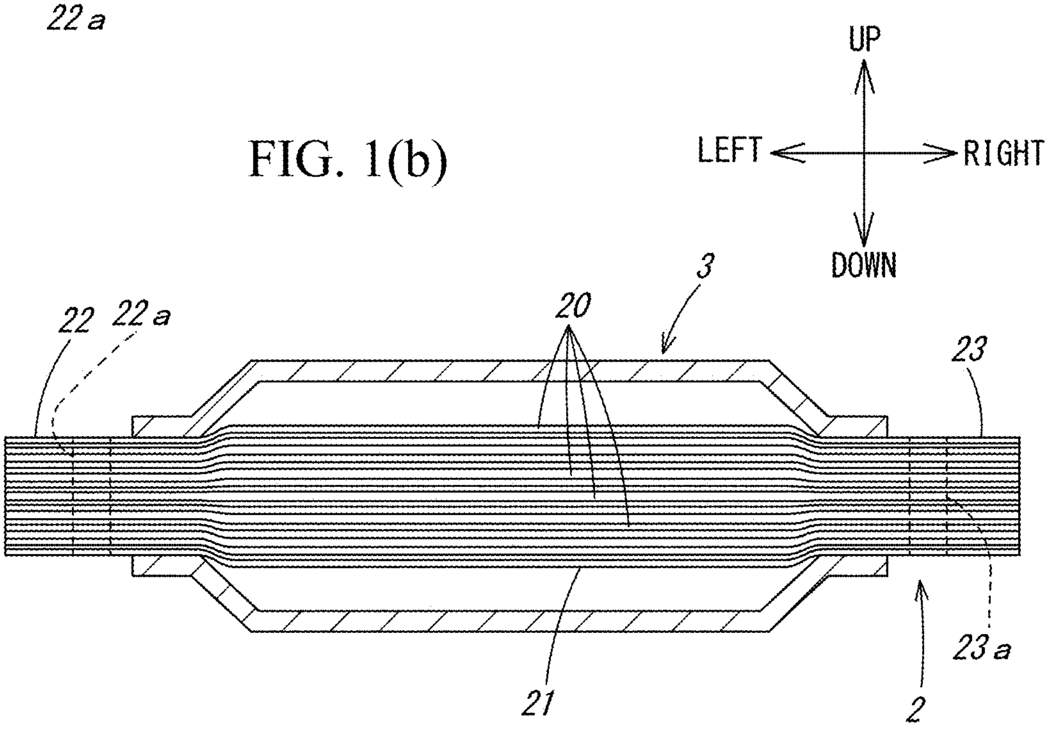

A flexible bus bar 1 shown in FIG. 1 can maintain its flexibility even when covered with an insulator. Specifically, the flexible bus bar 1 shown in FIG. 1 is mainly composed of a flexible bus bar main body 2 and an insulator 3. In the following, each configuration will be described in detail.

As shown in FIG. 1(*b*), the flexible bus bar main body 2 is formed in a horizontally long rectangular shape when viewed from the side, is formed by laminating sheet-shaped flexible conductive material foils 20 made of metal such as copper, and can carry a large current.

The thus-formed flexible bus bar main body 2 is composed of an intermediate portion 21, a left terminal portion 22, and a right terminal portion 23 as shown in FIG. 1(*b*). In the intermediate portion 21, the conductive material foils 20 are simply laminated and the conductive material foils 20 are not fixed. Thus, the intermediate portion 21 has flexibility.

On the other hand, as shown in FIG. 1(*b*), the left terminal portion 22 is located on the left side of the intermediate portion 21 and has the conductive material foils 20 laminated at the left terminal portion 22, but these conductive material foils 20 are fixed by crimping, welding, or the like. Therefore, the left terminal portion 22 does not have flexibility. As shown in FIG. 1(*a*) and FIG. 1(*b*), the left terminal portion 22 is provided with a long-hole elliptical left bolt hole 22*a* penetrating in the vertical direction.

On the other hand, as shown in FIG. 1(*b*), the right terminal portion 23 is located on the right side of the intermediate portion 21 and has the conductive material foils 20 laminated at the right terminal portion 23, but these conductive material foils 20 are fixed by crimping, welding, or the like. Therefore, the right terminal portion 23 does not have flexibility. As shown in FIG. 1(*a*) and FIG. 1(*b*), the right terminal portion 23 is provided with a long-hole elliptical right bolt hole 23*a* penetrating in the vertical direction.

Figure 2A:
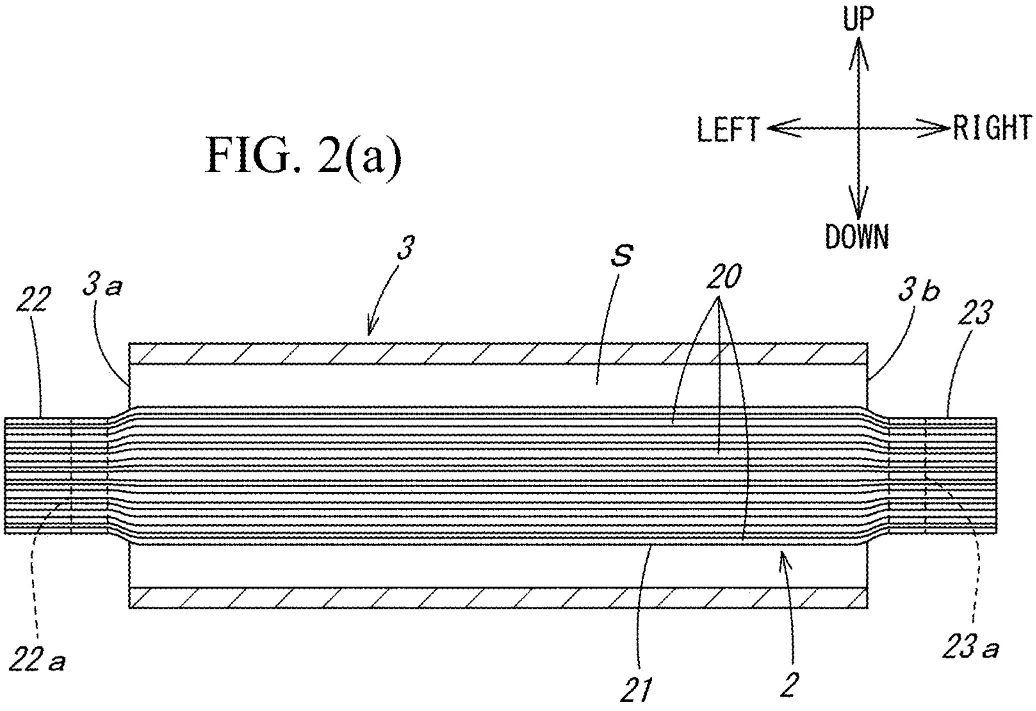
FIG. 2(*a*) shows an insulator according to the same embodiment in a longitudinal sectional view and is a side view showing a state in which a flexible bus bar main body is arranged within the insulator, and FIG. 2(*b*) is a side view showing a state in which both ends of the insulator are fixed to the flexible bus bar main body from the state shown in FIG. 2(*a*).
Figure 2B:
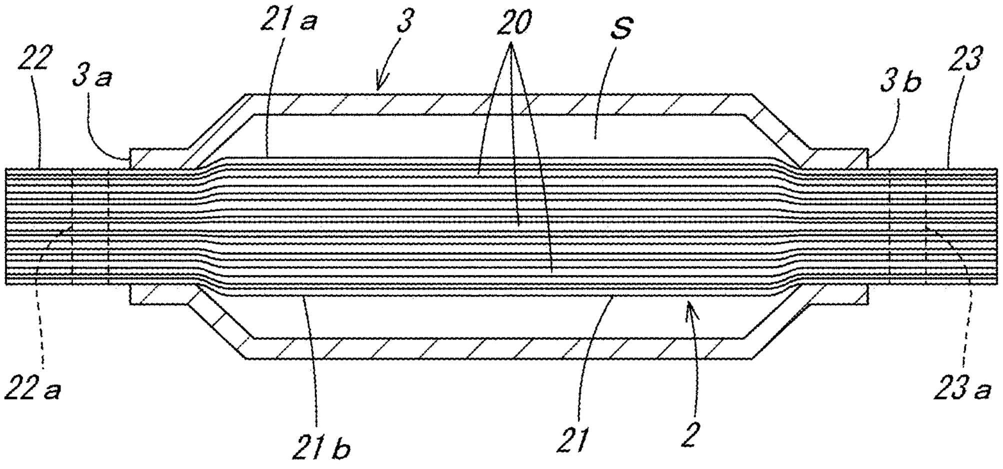

The insulator 3 is made of an insulating material formed of heat-shrinkable resin composed of a thermosetting resin elastomer, etc., and has flexibility. As shown in FIG. 2(*a*), such an insulator 3 has an interior S formed hollow and is formed into a rectangular cylindrical shape in cross section, a left side surface 3*a* and a right side surface 3*b* thereof are open.

In manufacturing the flexible bus bar 1 thus configured, first, as shown in FIG. 2(*a*), the flexible bus bar main body 2 is inserted into the interior S of the insulator 3. Thereby, as shown in FIG. 2(*a*), the intermediate portion 21 is located in the interior S of the insulator 3, the left terminal portion 22 is exposed to the outside and located on the left side surface 3*a* side of the insulator 3, and the right terminal portion 23 is exposed to the outside and located on the right side surface 3*b* side of the insulator 3.

Next, in this state, heat is applied to the left side surface 3*a* side of the insulator 3 shown in FIG. 2(*a*), and heat is applied to the right side surface 3*b* side of the insulator 3 shown in FIG. 2(*a*). Thereby, as shown in FIG. 2(*b*), the left side surface 3*a* side of the insulator 3 is heat-shrunk and fixed to an upper surface 21*a* and a lower surface 21*b* on the left side of the intermediate portion 21. Further, as shown in FIG. 2(*b*), the right side surface 3*b* side of the insulator 3 is heat-shrunk and fixed to the upper surface 21*a* and the lower surface 21*b* on the right side of the intermediate portion 21. Thereby, the insulator 3 is positioned and fixed to the flexible bus bar main body 2.

Therefore, the flexible bus bar 1 shown in FIG. 1 is manufactured in this manner.

Figure 3:
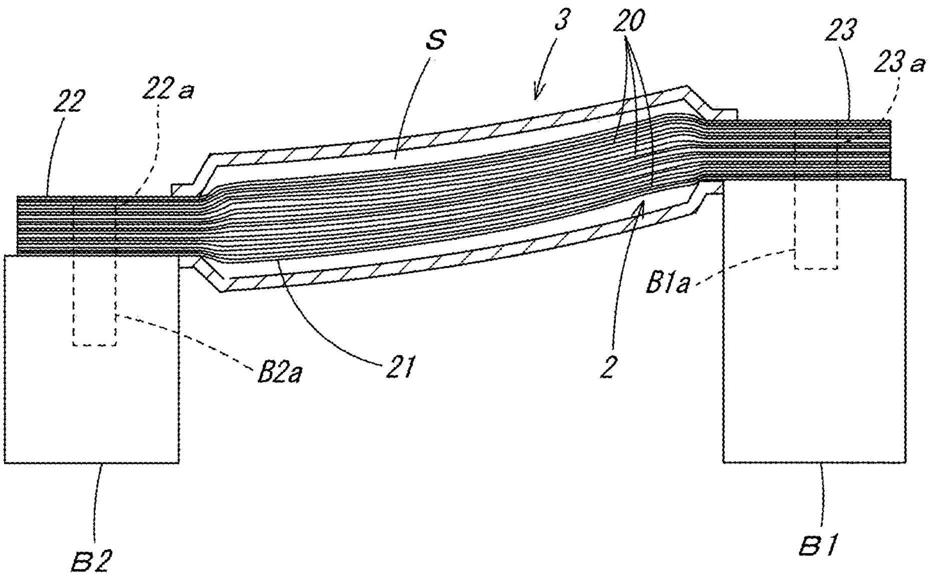
FIG. 3 is an explanatory diagram showing a state in which the flexible bus bar according to the same embodiment is arranged between a first member and a second member.
Figure 4A:
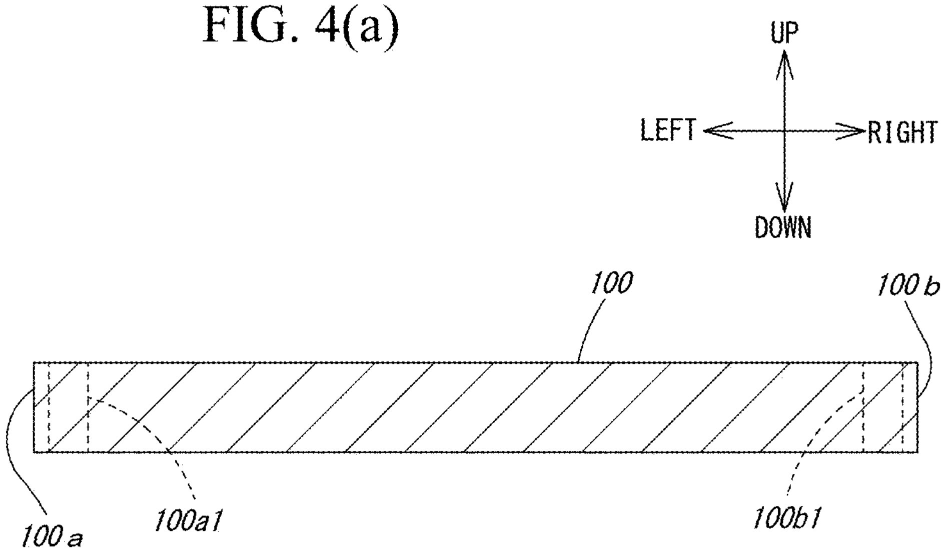
FIG. 4(*a*) is a longitudinal sectional view of a conventional bus bar, and FIG. 4(*b*) is an explanatory diagram showing a state in which the conventional bus bar is arranged between the first member and the second member.
Figure 4B:
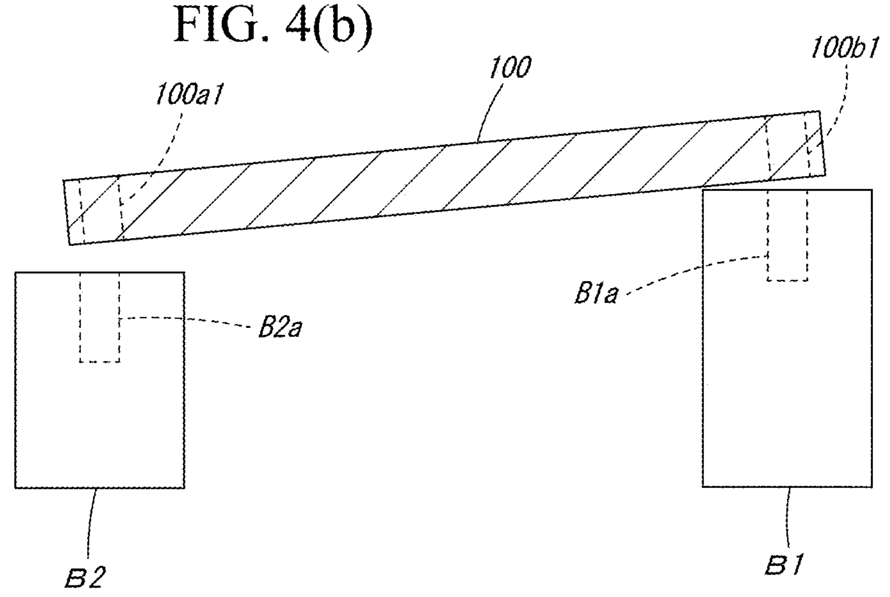

Incidentally, the flexible bus bar 1 manufactured as described above is such that, as shown in FIG. 3, a first bolt hole B1*a* provided in a first member B1 and the right bolt hole 23*a* are aligned and fastened with a bolt (not shown) and a second bolt hole B2*a* provided in a second member B2 shown in FIG. 3 and the left bolt hole 22*a* are aligned and fastened with a bolt (not shown). At this time, as shown in FIG. 3, there is a difference in height between the first member B1 and the second member B2. However, since a space is formed between the intermediate portion 21 and the interior S of the insulator 3, the flexibility of the intermediate portion 21 is not impaired unlike the conventional case. That is, in the conventional case, since the intermediate portion 21 and the insulator 3 are in close contact with each other, the flexibility of the intermediate portion 21 depends on the flexibility of the insulator 3, and if the insulator 3 hardens and loses its flexibility, the flexibility of the intermediate portion 21 is impaired. In this regard, in the present embodiment, since the space is formed between the intermediate portion 21 and the interior S of the insulator 3, the flexibility of the intermediate portion 21 is not impaired unlike the conventional case. Therefore, the intermediate portion 21 flexibly changes its shape (a curve is exemplified in FIG. 3) so as to fill the difference in height. Thereby, the shape of the flexible bus bar 1 can be flexibly changed in connecting the energizable members.

Also, since the insulator 3 is not completely fixed to the intermediate portion 21 in the present embodiment, even if the intermediate portion 21 changes its shape (a curve is exemplified in FIG. 3), the insulator 3 does not crack unlike the conventional case.

Therefore, according to the present embodiment described above, the flexibility can be maintained even when covered with the insulator 3.

Note that the shape and the like shown in the present embodiment are merely examples, and various modifications and changes can be made within the scope of the gist of the present invention described in the claims. For example, in the present embodiment, an example has been shown in which the left side surface 3*a* side and the right side surface 3*b* side of the insulator 3 are heat-shrunk and fixed to the flexible bus bar main body 2.

However, the present invention is not limited thereto, and any place may be used as long as the insulator 3 can be positioned and fixed to the flexible bus bar main body 2. That is, any place may be used as long as a part of the insulator 3 is fixed to the flexible bus bar main body 2.

However, it is preferable that the left side surface 3*a* side and the right side surface 3*b* side of the insulator 3 are heat-shrunk and fixed to the flexible bus bar main body 2. This is because a malfunction such as current not flowing between the first member B1 and the second member B2 may occur if the position of the insulator 3 shifts and the insulator 3 hangs over (comes in contact with) the left bolt hole 22*a* of the left terminal portion 22 and/or the right bolt hole 23*a* of the right terminal portion 23. Therefore, it is preferable that the left side surface 3*a* side and the right side surface 3*b* side of the insulator 3 are heat-shrunk and fixed to the flexible bus bar main body 2.

Also, as shown in FIG. 3 shown in the present embodiment, if the first member B1 and the second member B2 are connected using the flexible bus bar 1 and then fixed at the position, heat may be applied to the entire insulator 3 to heat-shrink the insulator 3 and completely fix to the upper surface 21*a* and the lower surface 21*b* of the intermediate portion 21. However, it is preferable to leave it as is. This is because a problem may arise that when vibration occurs in the flexible bus bar 1, the vibration cannot be absorbed if completely fixed, and the bolts (not shown) used to connect the first member B1 and the second member B2 may come off, and the flexible bus bar 1 connecting the first member B1 and the second member B2 may be detached. Therefore, it is preferable to leave it as is.

Also, in the present embodiment, as the flexible bus bar main body 2, one in which the sheet-shaped flexible conductive material foils 20 made of metal such as copper are laminated is exemplified. However, the present invention is not limited thereto and can be applied to any flexible bus bar such as a braided wire or a bundle of electric wires.

The invention claimed is:

1. A flexible bus bar comprising:

a flexible bus bar main body having flexibility and having first and second end portions and an intermediate portion between the first and second end portions;

an insulator covering a part of the flexible bus bar main body;

the insulator having a hollow interior and being made of heat-shrinkable resin;

the flexible bus bar main body being inserted into the hollow interior;

parts of the insulator being heat-shrunk onto the first and second end portions of the flexible bus bar main body, thereby bringing the parts of the insulator into close contact with the flexible bus bar body and fixing the parts of the insulator to the flexible bus bar main body; and space is formed between the insulator and the flexible bus bar main body along the intermediate portion such that the insulator is not in close contact with the intermediate portion.

2. The flexible bus bar according to claim 1, wherein:

the flexible bus bar main body has through holes formed at the first and second end portions; and in fixing the parts of the insulator to the flexible bus bar main body, the insulator is fixed to the flexible bus bar main body by heat-shrinking the insulator so as not to come in contact with the through holes.

* * * * *